US008855844B2

(12) United States Patent
Schwindt

(10) Patent No.: US 8,855,844 B2
(45) Date of Patent: Oct. 7, 2014

(54) SYSTEM AND METHOD FOR OPTIMAL DECELERATION OF A VEHICLE USING REGENERATIVE BRAKING

(75) Inventor: Oliver Schwindt, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 13/271,022

(22) Filed: Oct. 11, 2011

(65) Prior Publication Data
US 2013/0090822 A1    Apr. 11, 2013

(51) Int. Cl.
  B60L 7/22        (2006.01)
  B60L 7/18        (2006.01)
  (Continued)

(52) U.S. Cl.
  CPC ........ B60K 31/0008 (2013.01); B60W 2550/10 (2013.01); B60W 10/08 (2013.01); B60T 7/22 (2013.01); B60T 1/10 (2013.01); B60L 3/0015 (2013.01); B60L 7/12 (2013.01); B60L 3/00 (2013.01); B60L 2240/16 (2013.01); B60T 7/042 (2013.01); B60L 7/22 (2013.01); B60W 2520/10 (2013.01); B60W 10/06 (2013.01); B60W 2510/083 (2013.01); B60T 2201/022 (2013.01); B60W 10/184 (2013.01); B60L 15/2009 (2013.01); B60L 3/12 (2013.01); B60K 2031/0033 (2013.01); B60L 2240/12 (2013.01); B60T 2210/36 (2013.01); B60T 2270/604 (2013.01); B60W 10/18 (2013.01); B60L 7/10 (2013.01); B60W 30/18127 (2013.01); B60Y 2400/3015 (2013.01); B60T 8/17558 (2013.01); B06L 15/10 (2013.01); B60W 2720/106 (2013.01)
  USPC .............................. 701/22; 701/70

(58) Field of Classification Search
  USPC ............................................ 701/22
  See application file for complete search history.

(56) References Cited

U.S. PATENT DOCUMENTS 5,251,680 A    10/1993  Minezawa et al.
5,291,960 A     3/1994  Brandenburg et al.
(Continued)

FOREIGN PATENT DOCUMENTS

DE        19758782       6/2006
EP         1839985      10/2004
(Continued)

OTHER PUBLICATIONS

Hoon Yeo et al., "Regenerative Braking Algorithm for a HEV with CVT Ratio Control During Deceleration," available at least as early as Aug. 1, 2011 (7 pages).

(Continued)

Primary Examiner — John R Olszewski
Assistant Examiner — Jean-Paul Cass
(74) Attorney, Agent, or Firm — Michael Best & Friedrich LLP

(57) ABSTRACT

A regenerative braking system for a vehicle. The system includes at least one detecting device or sensor, and an electronic control unit having a processor and a computer readable medium. The sensor detects information about at least one target object located ahead of the vehicle. The electronic control unit is in electronic communication with the sensor to receive the information about the at least one target object and stores instructions that, when executed by the processor, cause the processor to: receive information about a velocity of the vehicle, determine a velocity of the at least one target object based on the information from the at least one detection device, determine a maximum deceleration of the vehicle that can be reached by the regenerative braking system without applying physical brakes of the vehicle, and determine an optimal braking point to begin maximum regenerative braking.

20 Claims, 4 Drawing Sheets

(51) Int. Cl.
*B60L 15/20* (2006.01)
*G06F 19/00* (2011.01)
*B60W 10/08* (2006.01)
*B60T 7/22* (2006.01)
*B60T 1/10* (2006.01)
*B60L 3/00* (2006.01)
*B60L 7/12* (2006.01)
*B60T 7/04* (2006.01)
*B60W 10/06* (2006.01)
*B60K 31/00* (2006.01)
*B60W 10/184* (2012.01)
*B60L 3/12* (2006.01)
*B60W 10/18* (2012.01)
*B60L 7/10* (2006.01)
*B60W 30/18* (2012.01)
*B60T 8/1755* (2006.01)

(56) References Cited

U.S. PATENT DOCUMENTS

| | | | | |
|---|---|---|---|---|
| 5,615,933 | A * | 4/1997 | Kidston et al. | 303/152 |
| 6,176,556 | B1 | 1/2001 | Kizer | |
| 6,233,515 | B1 * | 5/2001 | Engelman et al. | 701/96 |
| 6,467,267 | B2 * | 10/2002 | Kanazawa et al. | 60/552 |
| 6,809,429 | B1 * | 10/2004 | Frank | 290/40 C |
| 7,131,708 | B2 | 11/2006 | Tao et al. | |
| 7,147,239 | B2 | 12/2006 | Teslak et al. | |
| 7,232,192 | B2 | 6/2007 | Teslak et al. | |
| 7,922,265 | B1 * | 4/2011 | Cottrell | 303/152 |
| 7,925,426 | B2 * | 4/2011 | Koebler et al. | 701/123 |
| 8,031,062 | B2 * | 10/2011 | Smith | 340/438 |
| 8,062,175 | B2 * | 11/2011 | Krueger et al. | 477/29 |
| 8,073,605 | B2 * | 12/2011 | Naik et al. | 701/70 |
| 8,135,526 | B2 * | 3/2012 | Minarcin et al. | 701/70 |
| 8,260,481 | B2 * | 9/2012 | Naik et al. | 701/22 |
| 8,352,097 | B2 * | 1/2013 | Crumm et al. | 701/3 |
| 2002/0023437 | A1 | 2/2002 | Kanazawa et al. | 60/562 |
| 2003/0184152 | A1 | 10/2003 | Cikanek et al. | |
| 2005/0151420 | A1 | 7/2005 | Crombez et al. | |
| 2006/0022519 | A1 | 2/2006 | Ji et al. | |
| 2008/0314663 | A1 | 12/2008 | Yamazaki et al. | |
| 2009/0118887 | A1 * | 5/2009 | Minarcin et al. | 701/22 |
| 2009/0118888 | A1 * | 5/2009 | Minarcin et al. | 701/22 |
| 2010/0042277 | A1 * | 2/2010 | Naik et al. | 701/22 |
| 2010/0113214 | A1 * | 5/2010 | Krueger et al. | 477/28 |
| 2010/0250083 | A1 * | 9/2010 | Takahashi et al. | 701/70 |
| 2010/0256835 | A1 * | 10/2010 | Mudalige | 701/2 |
| 2011/0066308 | A1 * | 3/2011 | Yang et al. | 701/22 |
| 2011/0093177 | A1 * | 4/2011 | Horn | 701/70 |
| 2011/0118920 | A1 | 5/2011 | Kim | |
| 2011/0172864 | A1 * | 7/2011 | Syed et al. | 701/22 |
| 2011/0246012 | A1 * | 10/2011 | McClain | 701/22 |

FOREIGN PATENT DOCUMENTS

| | | |
|---|---|---|
| EP | 1522450 | 4/2005 |
| JP | H06165304 | 6/1994 |

OTHER PUBLICATIONS

Samy M. Ghania, "Study of Regenerative Braking of Electrical Vehicles," ESRJ Shoubra Faculty of Engineering, dated Jan. 2011 (16 pages).

Ki Hwa Jung et al., "Analysis of the Regenerative Braking System for a Hybrid Electric Vehicle using Electro-Mechanical Brakes," available at least as early as Aug. 1, 2011 (12 pages).

Continental Automotive, "Regenerative Brake System," http://www.conti-online.com/generator/www/de/en/continental/automotive/themes/passenger_cars/chassis_safety/ebs/extended_functions/brems_systeme_en.html, available at least as early as Aug. 1, 2011 (1 page).

Electronicsbus, "Regenerative Braking System for Hybrid Vehicles," http://electronicsbus.com/regenerative-braking-system-hybrid-vehicles/, available at least as early as Aug. 1, 2011 (2 pages).

Hybrid Car Guide, "Regenerative Braking," http://www.hybridcarguide.com/regenerative-braking.html, available at least as early as Aug. 1, 2011 (1 page).

InsightCentral.net, "Deceleration/Regenerative Braking Mode," http://www.insightcentral.net/encyclopedia/enregenerativebraking.html, dated 2008 (2 pages).

World of Technology, "Seminar on Regenerating Braking System," http://ramkrushna10.blogspot.com/2011/02/seminar-on-regenerating-braking-system.html, dated Feb. 1, 2011 (5 pages).

S. R. Cikanek et al., "Regenerative Braking System for a Hybrid Electric Vehicle," dated May 8-10, 2002 (6 pages).

Department of Mechanical Engineering, "A Seminar Report on Regenerative Breaking System," available at least as early as Aug. 1, 2011 (23 pages).

International Search Report and Written Opinion for Application No. PCT/US2012/059644 dated Jun. 6, 2013 (11 pages).

* cited by examiner

SYSTEM AND METHOD FOR OPTIMAL DECELERATION OF A VEHICLE USING REGENERATIVE BRAKING

BACKGROUND

The present invention relates to regenerative braking systems.

SUMMARY

Some vehicles, and in particular hybrid and electric vehicles, can include multiple drive sources, such as an internal combustion engine and an alternate drive source that is not powered by gasoline or another fossil fuel. Many vehicles are equipped with regenerative brakes that act as an energy recovery mechanism that slows the vehicle by converting its kinetic energy into another form, which can be either used immediately or stored until needed. This contrasts with conventional physical braking systems, where the excess kinetic energy is converted to heat by friction in the brake linings and, therefore, wasted. Hybrid and electric vehicles can achieve fuel consumption reductions by using a regenerative drive strategy during deceleration in which electrical, mechanical, or hydraulic energy is stored during braking and later used to power the vehicle via the alternate drive source.

Embodiments of the invention provide a regenerative braking system for a vehicle. The regenerative braking system includes at least one detecting device or sensor, and an electronic control unit having a processor and a computer readable medium. The at least one sensor detects information about at least one target object located ahead of the vehicle. The electronic control unit is in electronic communication with the at least one sensor to receive the information about the at least one target object and stores instructions that, when executed by the processor, cause the processor to: receive information about a velocity of the vehicle, determine a velocity of the at least one target object based on the information from the at least one sensor, determine a maximum deceleration of the vehicle that can be reached by the regenerative braking system without applying physical brakes of the vehicle, and determine an optimal braking point to begin maximum regenerative braking. The optimal braking point is a point at which maximum regenerative braking can sufficiently slow the vehicle before reaching the target object without applying the physical brakes of the vehicle.

In another embodiment, the invention provides a method of optimal deceleration of a vehicle by using a regenerative braking system. At least one detecting device or sensor detects information about at least one target object located ahead of the vehicle. An electronic control unit receives information about the target object, receives information about a velocity of the vehicle, determines a velocity of the at least one target object based on the information from the at least one sensor. The electrical control unit determines a maximum deceleration that can be produced by the regenerative braking system without applying physical brakes of the vehicle, and determines an optimal braking point to begin maximum regenerative braking. The optimal braking point being is a point at which maximum regenerative braking can sufficiently slow the vehicle before reaching the target object without applying the physical brakes of the vehicle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In addition, it should be understood that embodiments of the invention may include hardware, software, and electronic components or modules that, for purposes of discussion, may be illustrated and described as if the majority of the components were implemented solely in hardware. However, one of ordinary skill in the art, based on a reading of this detailed description, would recognize that, in at least one embodiment, the electronic based aspects of the invention may be implemented in software (e.g., stored on non-transitory computer-readable medium). As such, it should be noted that a plurality of hardware and software based devices, as well as a plurality of different structural components may be utilized to implement the invention.

Figure 1:
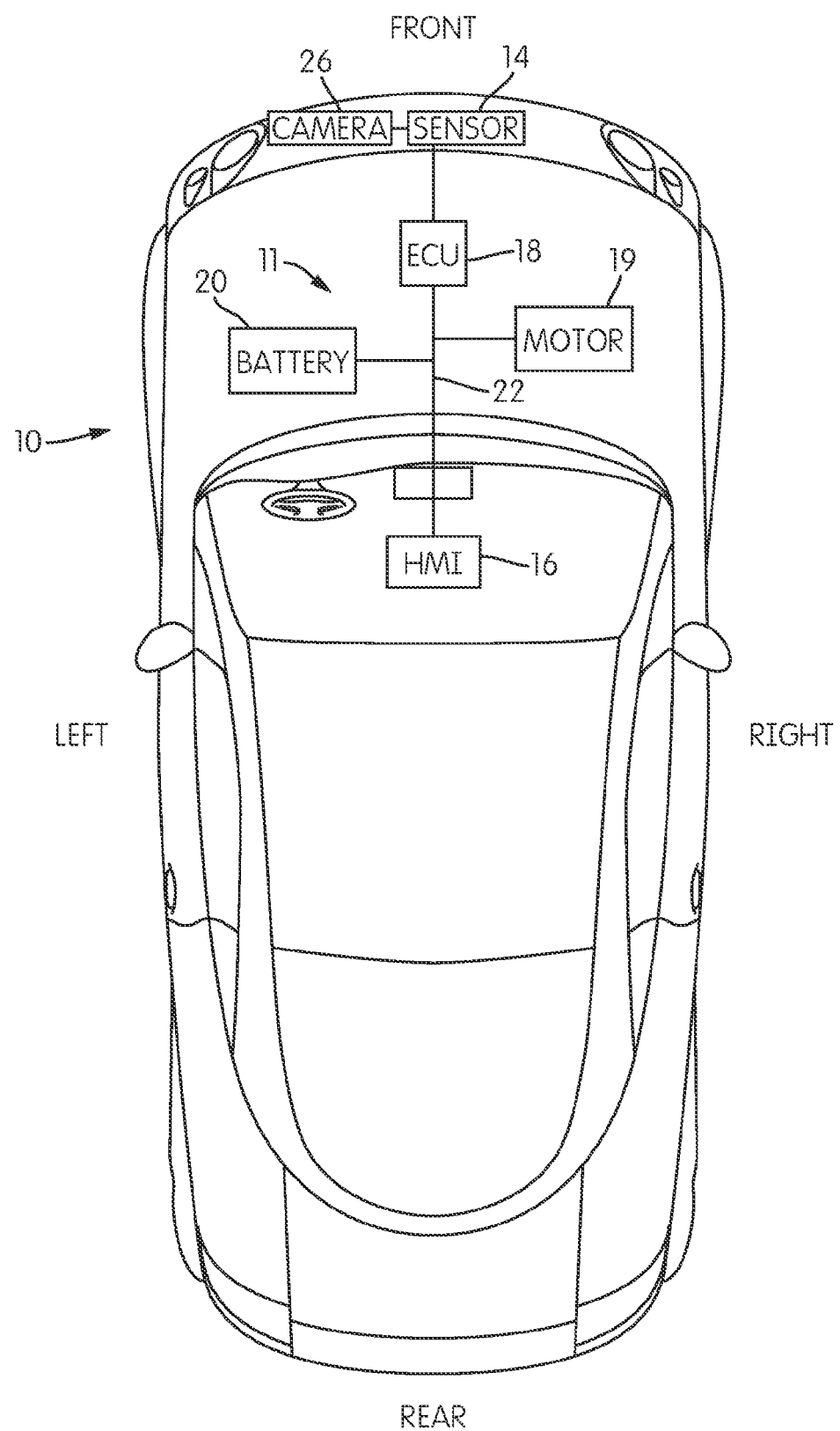
FIG. 1 is a top view of a vehicle including a regenerative braking system.

FIG. 1 illustrates a vehicle 10. The vehicle 10 is a hybrid vehicle or an electric vehicle and includes a regenerative braking system 11 used for decelerating the vehicle 10. The system 11 includes a detecting device or sensor 14 (e.g., a radar sensor), a human-machine interface ("HMI") 16, an electronic control unit ("ECU") 18, and a motor or regenerative brakes 19. The regenerative braking system 11 is connected to a vehicle battery 20, or another alternative drive source, that is configured to store and provide energy to the vehicle 10. The regenerative braking system 11 controls the regenerative braking of the vehicle 10 in an optimal way for energy efficient driving.

The sensor 14 is mounted on the front portion of the vehicle 10. The sensor 14 is positioned in the center of the front bumper of the vehicle 10 and is pointed forward. The HMI 16 (e.g., an LCD monitor) is located on the dashboard of the vehicle. The sensor 14, the HMI 16, and the ECU 18 are connected to a network, such as a controller area network, ("CAN") bus 22. The CAN bus 22 is connected to other vehicle systems. Alternatively, other connections (such as direct wired or wireless connections) can be used to connect the sensor 14 and the HMI 16 to the ECU 18.

The sensor 14 senses activity and target objects in areas or regions outside the perimeter of the vehicle 10. The target objects sensed fall into two broad categories: stationary objects (e.g., stop lights, traffic signs, railroad tracks, pavement, walls, parked vehicles, utility poles, etc.) and moving objects (e.g., moving vehicles, pedestrians, etc.). The sensor 14 may include, for example radar, ultrasonic, infrared light, and proximity (e.g., capacitive) sensors or other types of forward-looking technology configured to observe the area ahead of the vehicle 10. In FIG. 1, the sensor 14 is located in the front portion of the vehicle 10 (e.g., front bumper), but, in other embodiments, sensors 14 located on the sides (e.g., doors) or the rear portion (e.g., rear bumper) of the vehicle 10 are useful in detecting such objects.

The regenerative braking system 11 also includes a camera 26 configured to capture images of the area and objects ahead of the vehicle. The camera is usually mounted behind the windshield of the vehicle 10. The camera 26 monitors the driving path of the vehicle 10 and various objects in the surrounding environment, and continuously captures images in the visible and/or near infrared spectrum. The camera 26 provides images (or image data) to the ECU 18. The ECU 18 processes the images to detect moving or stationary objects. The ECU 18 includes a data processing module 25 configured to process the information obtained from the sensors 14 and/or the camera 26 during deceleration of the vehicle 10, which is controlled by the regenerative braking system 11.

Figure 2:
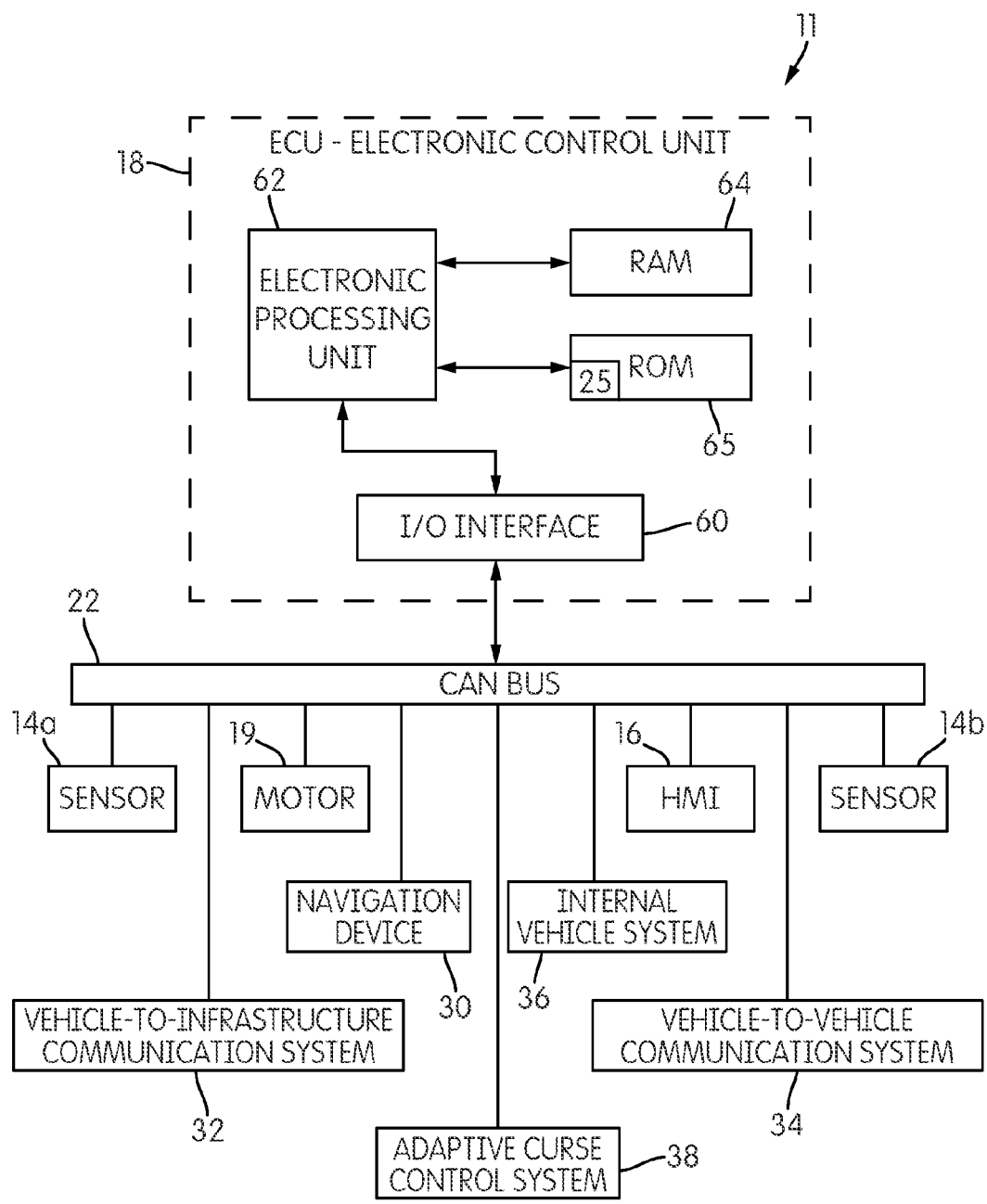
FIG. 2 is a schematic illustration of the regenerative braking system of FIG. 1.

FIG. 2 schematically illustrates the regenerative braking system 11 in more detail. As shown in FIG. 2, the system 11 includes the ECU 18, the motor 19, sensors 14a and 14b, the HMI 16, and the bus 22. As further discussed below, the ECU 18 can also communicate with other devices or systems through the CAN bus 22. However, in other embodiments, the ECU 18 obtains information (i.e., data) directly from the sensor 14 rather than over the bus 22.

As shown in FIG. 2, the ECU 18 includes an input/output interface 60, an electronic processing unit ("EPU") or a processor 62, and one or more non-transitory memory modules, such as a random access memory ("RAM") 64 and read-only memory ("ROM") 65. The input/output interface 60 transmits and receives data over the bus 22, including data from the sensors 14. It should be understood that the ECU 18 can include multiple processors, additional computer-readable medium modules, multiple I/O interfaces, and/or other additional components or modules (e.g., hardware, software, or a combination thereof).

The input/output interface 60 allows the ECU 18 to communicate with other components inside the vehicle 10 (e.g., over the CAN 22) and outside of the vehicle 10. In other words, the input/output interface 60 receives data from outside the ECU 18 and outputs information outside the ECU 18. For example, the input/output interface 60 can include a network interface, such a vehicle-to-vehicle communication device or a wireless network card, that allows the system 11 to send and receive information over a network, such as a local area network or the Internet. In some embodiments, the input/output interface 60 is located external to the ECU 18 and may receive data from other devices or systems located in the vehicle 10. Similarly, the ECU 18 may be included within another vehicle control system rather than configured as a separate component. In addition, although not shown in FIG. 2, conditioning circuits or peripheral drivers may be used to interface the ECU 18 with the sensors 14.

In one embodiment, the ECU 18 is configured to communicate with a navigation device 30 (e.g., a GPS that is internal or external to the vehicle 10), a vehicle-to-infrastructure communication system 32, or a vehicle-to-vehicle communication system 34. The ECU 18 is configured to receive information from these systems. For example, the ECU 18 receives information about various stationary objects (e.g., traffic sign, stop light, railway crossing, etc.), traffic information (e.g., incoming change of traffic light, change of speed limits, etc.), or information about moving object (e.g., moving vehicles). Further, the ECU 18 is configured to communicate with an electronic stability control system or another internal vehicle system 36 (e.g., ESP® designed by Robert Bosch) to receive information about the state of the vehicle 10 (e.g., speed, velocity, acceleration, etc.).

Figure 3:
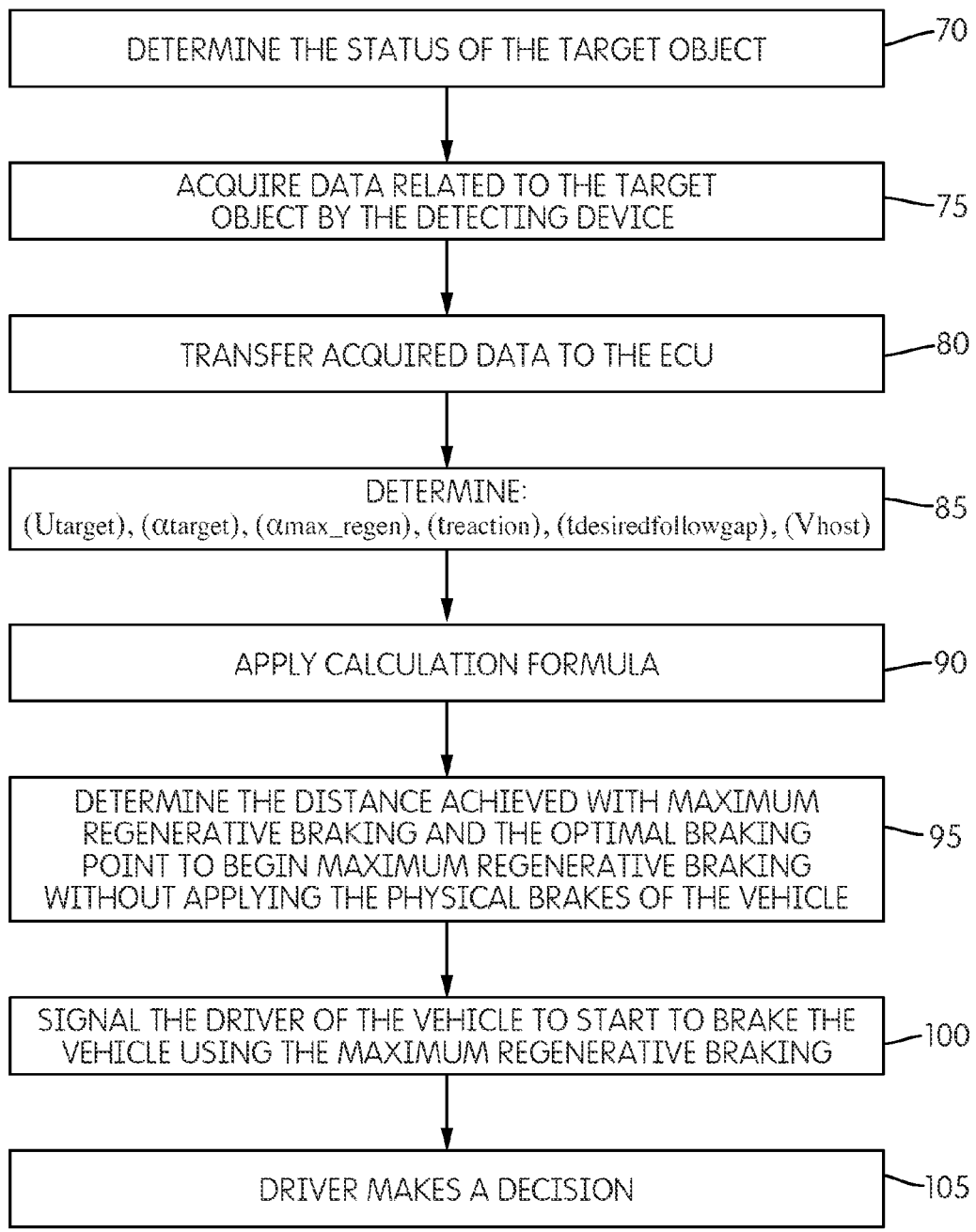
FIG. 3 is a flow chart illustrating a method of optimal deceleration of a vehicle performed by the regenerative braking system of FIG. 1.

The EPU 62 receives the information from the input/output interface 60 and processes the information by executing one or more instructions or modules (e.g., the data processing module 25). The instructions or modules are stored in non-transitory computer-readable medium, such as ROM 65. The EPU 62 stores and retrieves information (e.g., information received from the bus 22 or information generated by instructions or modules executed by the EPU 62) to and from the RAM 64. The non-transitory computer readable medium 65 includes volatile memory, non-volatile memory, or a combination thereof. The computer-readable medium 65 stores operating system software, applications and/or instructions, data, or combinations thereof. It should be understood that although only a single EPU, RAM, ROM, and input/output interface are illustrated in FIG. 3, the ECU 18 can include multiple processing units, memory modules, and/or input/output interfaces.

Although the ECU 18 is illustrated in FIGS. 1-2 as a separate component from the sensor 14, in some embodiments the ECU 18 is included in the sensor 14. In other embodiments, the ECU 18 is separate from the sensor 14 to prevent faults (e.g., electrical, mechanical, or software-based) in sensor 14 affecting the functionality provided by the ECU 18. The ECU 18 can also be combined with other vehicle controllers.

The instructions stored in the computer-readable medium provide particular functionality when executed by the EPU 62. The ECU 18 includes hardware and software and these components cooperate to execute the logic of the regenerative braking system 11. As shown in FIG. 2, the input/output interface 60 of the ECU 18 receives data from the sensors 14 or the other systems over the can 22 and provides the data to the processor 62 of the ECU 18. In some embodiments, the input/output interface 60 processes the data from the sensor 14 before providing the images to the processor 62 of the ECU 18. As described in more detail below with respect to FIGS. 3 and 4, the processor 62 processes the received data, determines various parameters related to different target objects positioned ahead of the vehicle 10, and determines an optimal braking point for the regenerative braking system 11 to begin maximum regenerative braking without applying the physical brakes of the vehicle 10.

Information about the start of maximum regenerative braking by the system 11 can be displayed on a viewing screen (not shown) of the HMI 16. The HMI 16 is positioned on a dashboard of the vehicle 10 and provides information to a vehicle operator (i.e., a driver) in various formats. In addition to the viewing screen, the HMI 16 can include a speaker (not shown) for providing audible information to the vehicle operator and/or one or more warning lights or light emitting diodes ("LEDs," not shown) for providing visual information to the vehicle operator. In some embodiments, the HMI 16 also includes one or more interactive interfaces (e.g., buttons) that allow the vehicle operator to communicate with the ECU 18 of the regenerative braking by the system 11 and/or with other systems of the vehicle 10.

As noted above, the ECU 18 is configured to receive specific information about the vehicle 10 (e.g., the velocity of the vehicle from the ESP 36). Further, the ECU 18 is configured to receive information from the sensors 14 about at least one moving or stationary target object (e.g., a target vehicle moving ahead of the vehicle 10, a traffic light, etc.). The regenerative braking system 11 is configured to process the received information and to determine at what point (i.e., an optimal braking point) the driver should start to brake the vehicle 10 using the maximum regenerative braking so the kinetic energy of the vehicle is not wasted by using the physical brake system. The optimal braking point being a point at which maximum regenerative braking can sufficiently slow the vehicle before reaching the target object. The regenerative braking system 11 uses the motor 19 to brake or slow down the vehicle 10. In electric and hybrid vehicles the energy saved during regenerative can be transferred to the battery 20. This will ultimately charge the battery 20 of the vehicle 10 and will extend the vehicle's driving range. Regenerative braking can also be applied to vehicles with internal combustion engines because it is also more fuel efficient to brake without using the physical brakes of the vehicle 10.

The EPU 62 of the ECU 18 receives information about the current velocity of the vehicle 10 ($V_{host}$). Using the data received from the sensor 14, the EPU 62 is configured to determine the following information about the target object ahead of the vehicle 10. The EPU 62 determines the velocity of the target object ($U_{target}$), the deceleration of the target object ($a_{target}$), the maximum deceleration of the vehicle 10 that can be reached by the regenerative braking system 11 without applying physical brakes ($a_{max\_regen}$), the distance between the vehicle 10 and the target object, and the time that the driver of the vehicle needs to react to the signal that he or she needs to brake with maximum regenerative braking ($t_{reaction}$). Using this information and additional data dependent on the type of target object (e.g., target vehicle traveling at constant speed, decelerating target vehicle, or stationary target object), the regenerative braking system 11 determines the optimal braking point to begin maximum regenerative braking without applying the physical brakes of the vehicle.

This optimal braking point is communicated to the driver via the HMI 16. In some hybrid and electric vehicles, the driver begins regenerative braking by removing his or her foot from the acceleration pedal of the vehicle. In other vehicles, particularly in hybrids, the brake pedal may need to be pressed to begin regenerative braking. For this reason, a controlled maximum regenerative braking is an advantage over the driver performing it. As explained in more detail below, the ECU 18 also communicates with an adaptive cruise control ("ACC") system 38 of the vehicle 10. The ACC system 38 is generally configured to detect the speed and distance of vehicles ahead of the vehicle 10 and to automatically adjust the speed of the vehicle 10 to maintain a safe following distance. When an ACC is configured to communicate with the regenerative braking system 11, the ACC system 38 controls the regenerative braking system 11 and begins maximum regenerative braking without requiring the driver to apply the physical brakes of the vehicle.

FIG. 3 illustrates a method of optimal deceleration of the vehicle 10 using regenerative braking performed by the ECU 18 according to one embodiment of the invention. For simplicity, one iteration of the logic of FIG. 3 is explained in detail below. In this embodiment, the vehicle 10 is approaching a slowly moving target object (e.g., another vehicle that is traveling in the same lane as the vehicle 10). The target vehicle is travelling at a constant speed that is lower than the speed of the vehicle 10. First, the ECU 18 determines the status of the target object (at step 70) (i.e., moving or stationary). In this example, the ECU 18 has determined that the target vehicle is moving. While the vehicle 10 is traveling, the sensor 14 acquires data related to the target object (at step 75). The acquired data is communicated to the ECU 18 of the regenerative braking system 11 (at step 80). As mentioned above, the processor 62 of the ECU 18 determines the velocity of the target object ($U_{target}$), the deceleration of the target object ($a_{target}$), the maximum deceleration of the vehicle 10 that can be reached by the regenerative braking system 11 without applying physical brakes ($a_{max\_regen}$), the distance between the vehicle 10 and the target object, and the time that the driver of the vehicle needs to react to the signal that he or she needs to brake with maximum regenerative braking ($t_{reaction}$) (at step 85).

Since the target object is moving and will not come to a standstill, the ECU 18 determines a target time gap with which the vehicle 10 should follow the target object ($t_{desiredfollowgap}$) (at step 85). In addition, the ECU 18 receives data about the current velocity of the vehicle 10 ($V_{host}$) (at step 85). Next, the ECU 18 performs calculations using the formula or equation below (at step 90) to determine the optimal braking point ($S_{warning1}$) of the vehicle 10 to begin maximum regenerative braking without applying the physical brakes of the vehicle (at 95). The optimal braking point identifies the distance between the vehicle 10 and the target vehicle achieved with maximum regenerative braking.

$$S_{warning\,1} = \frac{v_{host}^2 - u_{target}^2}{-2a_{max\_regen}} + u_{target} * t_{desiredFollowgap} + v_{host} * t_{reaction} \quad \text{Equation 1}$$

When the ECU 18 determines that the optimal braking point is reached, the ECU 18 signals the driver of the vehicle 10 to start to brake the vehicle 10 using the maximum regenerative braking so the kinetic energy of the vehicle is not wasted by the physical brake system (at step 100). As mentioned above, this is done by the HMI 16. The driver can decide to use maximum regenerative braking or to use the physical brakes (at step 105).

Figure 4:
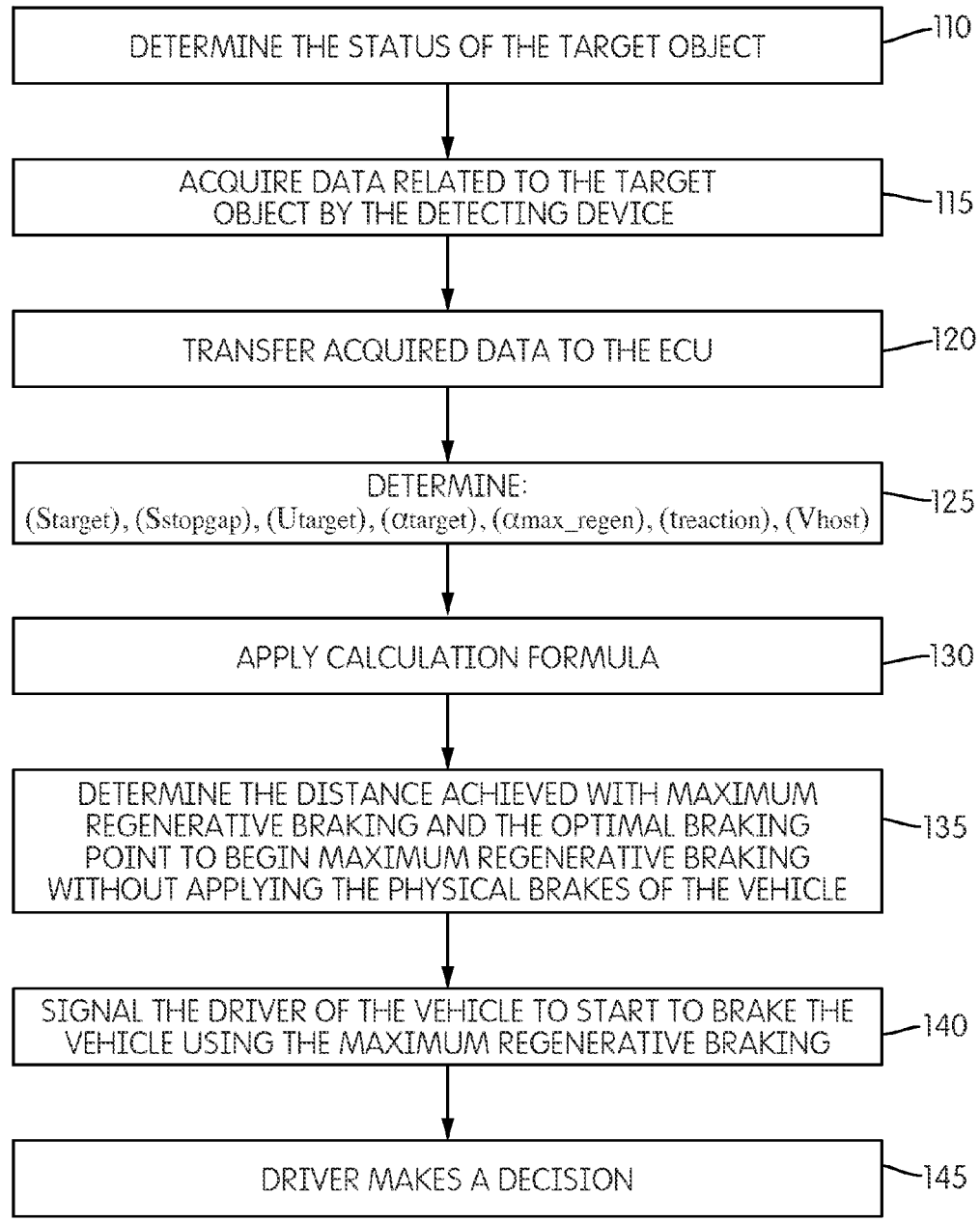
FIG. 4 is a flow chart illustrating an alternative method of optimal deceleration of a vehicle performed by the regenerative braking system of FIG. 1.

FIG. 4 illustrates an alternative method of optimal deceleration of the vehicle 10 by using regenerative braking performed by the ECU 18 of the regenerative braking system 11. In this embodiment, the vehicle 10 is approaching a decelerating target object (e.g., another vehicle that is slowing down due to traffic or a stop light and will eventually stop). The ECU 18 first determines the status of the target object (at step 110) (i.e., moving or stationary). The sensor 14 acquires data related to the target object (at step 115). This data is communicated to the ECU 18 of the regenerative braking system 11 (at step 120). The processor 62 of the ECU 18 determines the velocity of the target object ($U_{target}$) and the deceleration of the target object ($a_{target}$) (at step 125). Because the target vehicle will eventually reach a standstill position, the ECU 18 determines the distance for the target vehicle to reach standstill ($S_{target}$) (at step 125). The ECU 18 also determines the maximum deceleration of the vehicle 10 that can be reached by the regenerative braking system 11 without applying physical brakes ($a_{max\_regen}$), the time that the driver of the vehicle needs to react to the signal that he or she needs to brake with maximum regenerative braking ($t_{reaction}$), and the desired distance gap between the vehicle 10 and the target vehicle when the vehicle 10 comes to a stop behind the target object ($S_{stopgap}$) (at step 125). Next, the ECU 18 performs calculations using the formula or equation below (at step 130) to determine the optimal braking point ($S_{warning2}$) of the vehicle 10 to begin maximum regenerative braking without applying the physical brakes of the vehicle (at step 135). The optimal braking point identifies the distance between the vehicle 10 and the target vehicle achieved with maximum regenerative braking.

$$S_{warning\,2} = \frac{v_{host}^2}{-2a_{max\_regen}} - s_{target} + s_{stopgap} + v_{host} * t_{reaction} \quad \text{Equation 2}$$

$$\text{where } s_{target} = \text{MAX}\left(\frac{u_{target}^2}{-2a_{target}}, 0\right)$$

When the ECU 18 determines that the optimal braking point is reached, the ECU 18 sends a signal to the driver of the vehicle 10 (via the HMI 16) to start to brake the vehicle 10 using the maximum regenerative braking so the kinetic energy of the vehicle is not wasted by the physical brake system (at step 140). Finally, the driver makes a decision whether to use the maximum regenerative braking or to use the physical brakes (at step 145).

It is to be understood that the formulas above represent sample calculations. Therefore, other formulas can be used and elements can be added or removed from the formulas. Further, the system 11 can determine the optimal braking point to begin maximum regenerative braking for types of target objects other than a target vehicle moving ahead of the vehicle 10. As explained above, these target objects include moving vehicles in a different lane from the vehicle 10 and standing objects in the path of the vehicle 10. Thus, the method of optimal deceleration of the vehicle 10 by using regenerative braking can be applied to traffic lights, stop signs, railway crossings, etc. In these situations, the ECU 18 receives information not only from the sensor 14 but also from the navigation device 30, the vehicle-to-infrastructure communication system 32, the vehicle-to-vehicle communication system 34, or other similar systems.

As discussed above, when the regenerative braking system 11 is used with the ACC 38, the ACC system 38 is configured to control the regenerative braking system 11 to begin maximum regenerative braking based on a driver's direct input. For example, when the ACC system 38 is active and the driver receives a notification on the HMI 16 that regenerative braking can begin, the driver needs to press a button on the HMI 16 or otherwise provide authorization for maximum regenerative braking. This feature is required in order to allow the ACC system 38 to start maximum regenerative braking for target objects that are too far from the normal ACC system target selection. Such distant target objects might trigger a false activation of the ACC system 38. Therefore, a separate input or authorization by the driver is required. The ACC system 38 is also configured to start maximum regenerative braking for objects in neighboring lanes and/or for stationary objects based on input from the driver.

The examples described above are provided for illustrative purposes and can be implemented and carried out using other systems and methods. For example, the system 11 can include a plurality of sensors 14, and, in some embodiments, the HMI 16 can be omitted.

Thus, the invention provides, among other things, a system and a method of optimal deceleration of the vehicle 10 by using regenerative braking. Various features and advantages of the invention are set forth in the following claims.

What is claimed is:

1. A regenerative braking system for a vehicle, the regenerative braking system comprising:
   at least one detecting device, the at least one detecting device detecting information about at least one target object located ahead of the vehicle;
   an electronic control unit having a processor, the electronic control unit in electronic communication with the at least one detecting device to receive the information about the at least one target object; and
   a computer readable medium storing instructions that, when executed by the processor, cause the processor to:
   receive information about a velocity of the vehicle,
   determine a velocity of the at least one target object based on the information from the at least one detecting device,
   determine a maximum deceleration of the vehicle that can be reached by the regenerative braking system without ever applying physical brakes of the vehicle, and
   determine an optimal braking point to begin maximum regenerative braking,
   the optimal braking point being a point in time at which maximum regenerative braking can sufficiently slow the vehicle to achieve one of a time gap for following the target object and a distance gap for stopping behind the target object without ever applying the physical brakes of the vehicle.

2. The regenerative braking system of claim 1, wherein the computer readable medium further stores instructions that, when executed by the processor, cause the processor to determine a deceleration of the at least one target object, and wherein the optimal braking point is determined at least in part by using the deceleration of the target object.

3. The regenerative braking system of claim 1, wherein the computer readable medium further stores instructions that, when executed by the processor, cause the processor to determine a desired distance gap between the vehicle and the target object when the vehicle comes to a stop behind the target object, and wherein the optimal braking point is determined at least in part by using the distance gap.

4. The regenerative braking system of claim 1, wherein the computer readable medium further stores instructions that, when executed by the processor, cause the processor to determine a target time gap with which the vehicle should follow the target object, and wherein the optimal braking point is determined at least in part by using the target time gap.

5. The regenerative braking system of claim 1, wherein the computer readable medium further stores instructions that, when executed by the processor, cause the processor to determine a distance between the vehicle and the target object, and wherein the optimal braking point is determined at least in part by using the distance between the vehicle and the target object.

6. The regenerative braking system of claim 1, wherein the processor determines that the target object includes a target vehicle that is positioned in a same lane with the vehicle, and determines that the target vehicle is traveling at a constant speed lower than a current speed of the vehicle.

7. The regenerative braking system of claim 6, wherein the processor determines that the target vehicle is decelerating to reach a standstill position, and wherein the processor determines a distance for the target vehicle to reach the standstill position.

8. The regenerative braking system of claim 1, wherein the computer readable medium further stores instructions that, when executed by the processor, cause the processor to determine a distance achieved with maximum regenerative braking.

9. The regenerative braking system of claim 1, wherein the electronic control unit is configured to communicate with at least one of a navigation device, a vehicle-to-infrastructure communication system, or a vehicle-to-vehicle communication system.

10. The regenerative braking system of claim 1, wherein the processor determines that the target object includes a stationary object.

11. The regenerative braking system of claim 1, further comprising a human-machine interface, the human-machine interface configured to receive a signal informing a driver of the optimal braking point.

12. The regenerative braking system of claim 1, wherein the electronic control unit is configured to communicate with an adaptive cruise control system, and the adaptive cruise control controls the regenerative braking system to begin maximum regenerative braking without applying the physical brakes of the vehicle.

13. The regenerative braking system of claim 12, wherein the human-machine interface is configured to receive a signal informing the driver that the adaptive cruise control system can begin maximum regenerative braking, and wherein the human-machine interface is configured to receive a verification from the driver to continue.

14. The regenerative braking system of claim 1, wherein the computer readable medium further stores instructions that, when executed by the processor, cause the processor to determine a reaction time of the driver of the vehicle to react to the beginning of the maximum regenerative braking, and wherein the optimal braking point is determined at least in part by using the reaction time of the driver.

15. The regenerative braking system of claim 1, wherein the at least one detecting device includes a radar sensor.

16. A method of optimal deceleration of a vehicle by using a regenerative braking system, the method comprising:
   detecting, by at least one detecting device, information about at least one target object located ahead of the vehicle;
   receiving, at an electronic control unit, information about the target object from the at least one detecting device;
   receiving, at the electronic control unit, information about a velocity of the vehicle;
   determining, with a processor of the electronic control unit, a velocity of the at least one target object based on the information from the at least one detecting device;
   determining, with the processor, a maximum deceleration that can be produced by the regenerative braking system without ever applying physical brakes of the vehicle;
   determining, with the processor, an optimal braking point to begin maximum regenerative braking, the optimal braking point being a point in time at which maximum regenerative braking can sufficiently slow the vehicle to achieve one of a time gap for following the target object and a distance gap for stopping behind the target object without ever applying the physical brakes of the vehicle.

17. The method of claim 16, further comprising determining, by the processor, a deceleration of the at least one target object, and wherein the optimal braking point is determined at least in part by using the deceleration of the target object.

18. The method of claim 16, further comprising determining, by the processor, a desired distance gap between the vehicle and the target object when the vehicle comes to a stop behind the target object, and wherein the optimal braking point is determined at least in part by using the distance gap.

19. The method of claim 16, further comprising determining, by the processor, a target time gap with which the vehicle should follow the target object, and wherein the optimal braking point is determined at least in part by using the target time gap.

20. The method of claim 16, further comprising determining, by the processor, a distance between the vehicle and the target object, and wherein the optimal braking point is determined at least in part by using the distance between the vehicle and the target object.

* * * * *